(12) United States Patent
Lerner et al.

(10) Patent No.: US 10,472,954 B2
(45) Date of Patent: Nov. 12, 2019

(54) PIPING ASSEMBLY TRANSPONDER SYSTEM WITH ADDRESSED DATAGRAMS

(71) Applicant: AOI (Advanced Oilfield Innovations, Inc.), Stafford, TX (US)

(72) Inventors: Daniel Maurice Lerner, Missouri City, TX (US); Andre Orban, Sugarland, TX (US)

(73) Assignee: AOI (Advanced Oilfield Innovations), Stafford, TX (US)

( * ) Notice: Subject to any disclaimer, the term of this patent is extended or adjusted under 35 U.S.C. 154(b) by 0 days.

(21) Appl. No.: 15/845,556

(22) Filed: Dec. 18, 2017

(65) Prior Publication Data

US 2018/0216456 A1 Aug. 2, 2018

Related U.S. Application Data

(63) Continuation of application No. 14/741,059, filed on Jun. 16, 2015, now Pat. No. 9,874,090.

(Continued)

(51) Int. Cl.
*E21B 47/12* (2012.01)
*G05B 15/02* (2006.01)
(Continued)

(52) U.S. Cl.
CPC ............. *E21B 47/12* (2013.01); *E21B 34/06* (2013.01); *E21B 34/16* (2013.01); *G05B 15/02* (2013.01);
(Continued)

(58) Field of Classification Search
CPC ............................. B21B 47/12; B21B 47/122
(Continued)

(56) References Cited

U.S. PATENT DOCUMENTS

| 3,176,225 A | 3/1965 | Ransom et al. |
| 3,823,773 A | 7/1974 | Nutter |

(Continued)

FOREIGN PATENT DOCUMENTS

| GB | 2160565 A | 12/1985 |
| GB | 2309471 A1 | 7/1997 |
| WO | 00-60780 A1 | 10/2000 |

*Primary Examiner* — Kevin Kim
(74) *Attorney, Agent, or Firm* — ePatentManager.com; Guerry L. Grune

(57) ABSTRACT

A control system for generating and utilizing at least one or more addressed datagrams that communicate information to and from devices along piping assemblies comprising; one or more transmitters, one or more receivers, and one or more controllers, wherein the transmitters transmit information via one or more addressed datagrams encoded within a working medium to one or more receivers among the piping assemblies, is described. Transmitters convert datagrams into signals that are transmitted within the working medium and the receivers receive signals from the transmitters and also convert signals from the working medium which is converted back into datagrams. The controllers receive and decode the datagrams so that the controllers selectively communicate and perform logical operations on piping assembly devices according to directions received from the addressed datagrams. The entire control system can function as a network of controllers, receivers, transmitters, and/or transponders as required by one or more users.

21 Claims, 6 Drawing Sheets

Related U.S. Application Data

(60) Provisional application No. 62/017,030, filed on Jun. 25, 2014.

(51) Int. Cl.
| | |
|---|---|
| *G05D 7/06* | (2006.01) |
| *H04B 1/38* | (2015.01) |
| *G05B 19/042* | (2006.01) |
| *E21B 34/06* | (2006.01) |
| *E21B 34/16* | (2006.01) |

(52) U.S. Cl.
CPC ......... *G05B 19/042* (2013.01); *G05D 7/0629* (2013.01); *G05D 7/0635* (2013.01); *H04B 1/38* (2013.01); *Y02P 90/265* (2015.11)

(58) Field of Classification Search
USPC .......................................... 340/853.1–856.4
See application file for complete search history.

(56) References Cited

U.S. PATENT DOCUMENTS

| | | | |
|---|---|---|---|
| 3,896,667 A | 7/1975 | Jeter | |
| 3,986,554 A | 10/1976 | Nutter | |
| RE29,638 E | 5/1978 | Nutter | |
| 4,351,037 A | 9/1982 | Scherbatskoy | |
| 4,355,310 A | 10/1982 | Belaigues et al. | |
| 4,403,659 A | 9/1983 | Upchurch | |
| 4,425,083 A | 1/1984 | Peterson et al. | |
| 4,479,242 A | 10/1984 | Kurata | |
| 4,576,234 A | 3/1986 | Upchurch | |
| 4,703,279 A | 10/1987 | Chapman et al. | |
| 4,796,699 A | 1/1989 | Upchurch | |
| 4,856,895 A | 8/1989 | Upchurch | |
| 4,979,577 A | 12/1990 | Walter | |
| 5,333,686 A | 8/1994 | Vaughan et al. | |
| 5,553,083 A * | 9/1996 | Miller | H04L 1/1614 714/748 |
| 5,706,892 A | 1/1998 | Aeschbacher, Jr. et al. | |
| 5,875,523 A | 1/1999 | Edwards | |
| 5,937,945 A | 8/1999 | Bussear et al. | |
| 5,959,547 A | 9/1999 | Tubel et al. | |
| 6,053,261 A | 4/2000 | Walter | |
| 6,145,593 A | 11/2000 | Hennig | |
| 6,182,764 B1 | 2/2001 | Vaynshteyn | |
| 6,199,629 B1 | 3/2001 | Shirk et al. | |
| 6,373,248 B1 | 4/2002 | Poitzsch et al. | |
| 6,414,905 B1 | 7/2002 | Owens et al. | |
| 6,457,521 B1 | 10/2002 | Langseth et al. | |
| 6,598,682 B2 | 7/2003 | Johnson et al. | |
| 6,633,236 B2 | 10/2003 | Vinegar et al. | |
| 6,843,119 B2 | 1/2005 | Patey et al. | |
| 6,851,481 B2 | 2/2005 | Vinegar et al. | |
| 6,920,085 B2 | 7/2005 | Finke et al. | |
| 7,026,950 B2 | 4/2006 | Guggari et al. | |
| 7,103,511 B2 | 9/2006 | Petite | |
| 7,139,219 B2 | 11/2006 | Kolle et al. | |
| 7,201,231 B2 | 4/2007 | Chaplin et al. | |
| 7,261,162 B2 * | 8/2007 | Deans | E21B 41/0007 166/250.01 |
| 7,322,417 B2 | 1/2008 | Rytlewski et al. | |
| 7,325,616 B2 | 2/2008 | Lopez de Cardenas et al. | |
| 7,377,321 B2 | 5/2008 | Rytlewski | |
| 7,380,616 B2 | 6/2008 | Virally et al. | |
| 7,387,165 B2 | 6/2008 | Lopez de Cardenas et al. | |
| 7,460,438 B2 | 12/2008 | Hudson | |
| 7,510,001 B2 | 3/2009 | Spring et al. | |
| 7,565,833 B2 | 7/2009 | Gillen et al. | |
| 7,646,455 B2 | 1/2010 | Rho | |
| 7,823,689 B2 | 11/2010 | Aronstam et al. | |
| 7,958,715 B2 | 6/2011 | Kinert et al. | |
| 7,967,071 B2 | 6/2011 | Brown | |
| 7,999,695 B2 | 8/2011 | Rodney | |
| 8,069,926 B2 | 12/2011 | Eddison et al. | |
| 8,093,550 B2 | 1/2012 | Stoller | |
| 8,098,195 B2 | 1/2012 | Smith et al. | |
| 8,196,664 B2 | 6/2012 | Reid | |
| 8,276,674 B2 | 10/2012 | Lopez de Cardenas et al. | |
| 8,453,744 B2 | 6/2013 | Buss et al. | |
| 8,496,065 B2 | 7/2013 | McCarter et al. | |
| 8,505,632 B2 | 8/2013 | Guerrero et al. | |
| 8,517,113 B2 * | 8/2013 | Sheffield | E21B 34/06 166/332.1 |
| 8,536,731 B2 | 9/2013 | Biester et al. | |
| 8,540,021 B2 | 9/2013 | McCarter et al. | |
| 8,602,107 B2 | 12/2013 | Reid | |
| 8,602,112 B2 | 12/2013 | Reid | |
| 8,646,683 B2 | 2/2014 | Koplar | |
| 8,718,802 B2 | 5/2014 | Boone | |
| 2004/0262008 A1 | 12/2004 | Deans et al. | |
| 2006/0271299 A1 | 11/2006 | Ward et al. | |
| 2009/0045973 A1 * | 2/2009 | Rodney | E21B 47/12 340/853.2 |
| 2009/0066535 A1 * | 3/2009 | Patel | E21B 17/028 340/853.2 |
| 2009/0166045 A1 | 7/2009 | Wetzel et al. | |
| 2012/0103627 A1 | 5/2012 | Larssen et al. | |
| 2013/0024030 A1 | 1/2013 | Tubel et al. | |
| 2013/0112483 A1 | 5/2013 | Kibsgaard et al. | |
| 2013/0153666 A1 * | 6/2013 | Edwards | G06K 7/10 235/462.25 |

\* cited by examiner

PIPING ASSEMBLY TRANSPONDER SYSTEM WITH ADDRESSED DATAGRAMS

PRIORITY

This application is a continuation of and claims priority under 35 USC 120 from Nonprovisional application Ser. No. 14/741,059 filed Jun. 16, 2015, entitles "Piping Assembly Transponder System with Addressed Datagrams", which is a nonprovisional conversion of and claims priority under US 35 USC 119 from Provisional Application No. 62/017,030 entitled "Piping Assembly System with Addressed Datagrams" filed Jun. 25, 2014.

FIELD OF INVENTION

This invention relates generally to methods and apparatus for controlling the operation of piping assemblies. More specifically, the invention describes a new and improved downhole tool control system that responds to one or more addressable dynamic datagrams that comprise at least data and signals. A set of transceivers, receivers, and/or transponders transmit, receive, encode and decode one or more of the addressed datagrams so that controllers can selectively communicate and perform logical operations on devices used on piping assemblies according to directions received from the addressed datagrams.

BACKGROUND

Systems for controlling piping systems in general, and more specifically for controlling downhole petroleum based well operations have become common practice. Recent efforts have focused more specifically on fracing operations, which normally leads to a series of devices intended to provide a more intelligent completion and producing well. Older examples of the need for formation testing and evaluation using pressure controlled valve devices are such as those shown in the U.S. Pat. Re. No. 29,638. Related devices are illustrated, for example, in U.S. Pat. Nos. 3,823,773, 3,986,554 as well as in U.S. Pat. Nos. 4,403,659, 4,479,242 and 4,576,234 which all describe valve structures which are operably responsive to changes in the pressure of fluids that exist either in the tubing-to-casing annulus, or in the tubing itself.

These tools have all been used successfully in cased well bores using high level pressure signals which can be applied safely to the annulus fluids. However, in the past, some very deep, cased wells were not tested with pressure controlled tools because the operating pressure would have exceeded the burst rating of the casing. Testing in open (uncased) boreholes has more recently been achieved with standard pressure controlled tools. Until this was possible, certain types of valve devices, such as circulating valves and some sliding valves required lengthy operating times due to the complicated series of annulus or tubing pressure changes required to cycle the tool from the closed to opened positions and back again.

The older designs required dimensional lengths that often became excessive, to the point where a typical combination of tester, sampler and circulating valves could and in some cases still do require lengths in excess of 200-300 feet. Increased complexity of valve systems reduces their reliability, and increases the chances of mishaps and not performing the desired downhole operations. As a result of more recent efforts involving fracing and horizontal drilling, there is now an urgent need to increase the number of service operations that can be performed during single or multiple trips into any piping assembly, especially within the wellbore and during well completion and fracing operations.

SUMMARY

Therefore, a general object of the present invention is to provide an improved and networkable control system for piping assemblies. More specifically this disclosure involves a control system for downhole operated tools that are responsive to signals. These signals can individually, collectively, and/or through a network, comprise addressed datagrams for use by one or more controllers to control one or more devices throughout any piping assembly. The datagram control system is useful for hydrocarbon producing wells including both deep cased and open hole wells.

One object of the present invention is to provide a new and improved downhole control system to control controllable devices that include one or more energized power sources attached directly or remotely to these device(s). Using one or more controllers allows for making numerous operations on the controllable devices during single or successive runs.

The control system is designed for generating and utilizing at least one or more addressed datagrams that communicate information to and from piping assemblies and comprises;

one or more transmitters, one or more receivers, and one or more controllers, wherein the transmitters transmit information via one or more addressed datagrams encoded within a working medium to one or more receivers among the piping assemblies;

wherein the transmitters convert the datagrams into signals that are transmitted within the working medium and;

wherein one or more receivers receive signals from the transmitters and the receivers convert signals from the medium back into datagrams, and;

wherein one or more controllers receive and decode one or more datagrams so that the controllers selectively communicate and perform logical operations causing the devices to perform one or more actions.

These actions include measurements and/or movements and the datagrams can create and transmit new or existing datagrams. The datagrams contain logic packets of information that include one or more address portions and one or more data portions.

The transmitters are utilized by one or more controllable devices being operated between an open position and a closed position wherein operating between the open and closed position provides a measurable quantity of change so that signals are generated and controlled by changes occurring within the working medium channeled either directly through the controllable devices or bypassing the devices, or both.

The system, in this case, utilizes a working medium that is a mechanical, hydraulic, electrical, electro-magnetic, optical, radioactive, explosive, and/or chemical medium.

In a further embodiment, the controllable devices are well completion devices for wellbores.

The controllable devices can utilize one or more flow restrictors for providing a measurable quantity of signals, and the receivers can cause one or more actions in response to information received from the datagrams. The controllable devices can exist within production tubing and/or casing of wellbores. In addition, the controllable devices are selected from the group consisting of; valves, switches, pumps, meters, analyzers, transducers, transistors, laser transmitters and receivers, and optical fiber networks.

The controllable (often) completion devices can contain one or more receivers and can contain one or more transmitters. The controllable devices can also contain one or more transponders.

For the present invention, the piping assembly is often a downhole assembly within a borehole.

In an additional embodiment, the control system controls multiple devices within multiple zones along a length of the downhole assembly within the borehole. Often these devices are valves.

In the case of the present invention the term "datagram" is meant to be a self-contained, independent entity of data carrying sufficient information to be routed from a source to a destination computer, computer server, and/or internet interface without reliance on earlier exchanges between the source and the destination computer and the transporting network. A datagram needs to be self-contained without reliance on earlier data exchanges because there is no connection of fixed duration between the two communicating points as there is, for example, in most voice telephone conversations.

Datagram service is often compared to a mail delivery service, the user only provides the destination address, but receives no guarantee of delivery, and no confirmation upon successful delivery. Datagram service is therefore considered unreliable. Datagram service routes datagrams without first creating a predetermined path. Datagram service is therefore considered connectionless. There is also no consideration given to the order in which other datagrams are sent or received. In fact, many datagrams grouped together can travel along different paths before reaching the same destination.

The datagrams contain logic packets of information that include one or more addressed portions and one or more data portions. The datagrams also include checksum portions and/or sequencing criteria portions. The addressed portions contained within the datagrams are accessible by the controller and provide for communication with individual, collective groups, and/or networks of controllable devices. The data portions contained within the datagrams provide information that allows for controlling controllable devices by providing data portions corresponding with data obtained from making measurements within the working medium.

The controllers are capable of computing and are computer programmable, comprising one or more memories, one or more time clocks that keep track of time, and a status that is capable of reporting inputs, outputs, and resulting events by using logic packets of information obtained from datagrams for controlling these controllable devices.

Computing within and for utilizing the controllers includes; retrieving, storing, analyzing, organizing, and disseminating information from measurements obtained within the working medium using datagrams capable of providing, storing, and accessing data within or from the controllers. In this manner the controllers can perform logical operations for actuating controllable devices located along (within or external to) the piping system.

For the present invention, the datagrams normally adhere to a common system datagram protocol wherein the datagrams contain addresses and optionally contain data. The datagrams can also be encoded and decoded into barcodes. The datagrams also can contain IP addresses.

Another object of the present invention is that the transmitters, receivers, and controllers together with the use of the datagrams, form a "mesh network". In the present disclosure, the term "mesh network" is considered a network topology in which each node (known as a "mesh node") relays data for the network. All nodes cooperate to allow for distribution of data in the network. A mesh network can be designed using a flooding technique or a routing technique. When using a routing technique, the message (datagram) is propagated along a path, by hopping from node to node until the destination is reached. To ensure all its paths' availability, a routing network must allow for continuous connections and reconfiguration around broken or blocked paths, using self-healing algorithms. A mesh network whose nodes are all connected to each other is a fully connected network. For example, fully connected wired networks have the advantages of security and reliability: problems in a cable affect only the two nodes attached to it. However, in such networks, the number of cables, and therefore the cost, goes up rapidly as the number of nodes increases.

It is also an embodiment of the present invention to utilize a wireless mesh network by using controlled fluctuations in signals generated using fiber optics, lasers, electromagnetics including eddy currents, magnetic, or other focused energy forms within the mesh network(s).

The controllers control controllable devices that can be well completion devices for wellbores. The control system can control multiple devices within multiple geologically diverse zones along a length of one or more downhole assemblies utilized within an oil field.

In yet another embodiment, the control system for generating and utilizing at least one or more addressed datagrams that communicate information to and from piping assemblies comprises;

one or more addressable transponders having one or more controllers, wherein the transponders transmit and receive information via one or more addressed datagrams encoded within a medium among the piping assemblies;

wherein the transponders convert the datagrams into signals that are transmitted within the medium and;

wherein the transponders receive and convert signals from the medium back into datagrams, and;

wherein the one or more controllers receive and decode one or more datagrams so that the transponders selectively communicate and perform logical operations causing the devices to perform one or more actions.

The transponders are utilized by one or more controllable devices being operated between an open position and a closed position wherein operating between the open and closed position provides a measurable quantity of change so that signals are generated and controlled by changes occurring within the working medium channeled either directly through the controllable devices or bypassing the devices, or both.

Another object of the present invention is to provide a new and improved remote controlled downhole system that does not require long operating times for making the system operational. Using this system also eliminates the need for a complicated sequence of well annulus or tubing pressure or other controlled energy fluctuations to provide device activation.

Still another object of the present invention is to provide a new and improved pressure responsive well testing tool that has a relatively short length, and which is simple and reliable in operation.

For the present invention, by utilizing a controller which could be a computer operated controller, the deficiencies regarding the use of datagrams are minimized and, in most cases eliminated. The controller exists to guarantee delivery and confirmation of signals from the transmitters to the receivers or to and from the transponders as well as to the specific devices at the specific locations to be controlled by the addressed datagrams. The datagram service can thus be transformed to become more reliable. It is possible to send back an acknowledgement if the datagram is received and it is also possible that there would be non-receipt of the datagram which could also be acknowledged by the intended receiver. This technique is known as an "ack/nack". In telecommunications, a negative-acknowledge character (NAK or NACK) is a transmission control character sent by a station as a negative response to the station with which the connection has been set up.

In Binary Synchronous Communications protocol, the NAK is used to indicate that an error was detected in the previously received block and that the receiver is ready to accept retransmission of that block. The datagrams can also be given either pre-determined, pre-programmed, or dynamically programmed sets of directions for determining the travel path of the service.

Another embodiment of the present invention includes utilizing one or more probes located in the piping assemblies that generate and/or utilize at least one or more addressed datagrams allowing communication from information contained within the datagrams, the probes comprising;

one or more addressable transponders having one or more controllers, wherein the transponders transmit and receive information via one or more addressed datagrams encoded within the probe and/or within the piping assemblies;

wherein the transponders convert the datagrams into signals that are transmitted from the probe to the piping assemblies or from the piping assemblies to the probe and;

wherein the transponders receive and convert signals from a fluid medium within the piping assemblies back into datagrams, and;

wherein the one or more probes receive and decode one or more datagrams so that the transponders within the probe and/or within the piping assemblies selectively communicate and perform logical operations causing one or more devices to take action.

The probes of the present invention can be used for installing, inventorying, accessing, actuating, and controlling one or more down-hole device(s) in a wellbore assembly comprising;

(i) marked sections along a length of an assembly within the wellbore, wherein components and/or portions of an original section of the assembly together function as unique readable active or passive markers,
(ii) the ability to read the markers,
(iii) the ability to act upon reading the markers using at least one reader by locating specific addresses within the wellbore corresponding with commands having a signature obtained from energy sources that transmit data which is compiled into a datagram, wherein the energy sources are initiated either at the surface or bottom of the wellbore.

The energy sources can be located either uphole or downhole using wellbore fluids within the wellbore thereby providing the ability for causing movement of the controllable devices. Likewise, the movement of the controllable devices, can provide changes in the working medium that provides signals.

In a further embodiment, a method for using the probes requires inserting the markers in strategically placed locations along an axial and/or radial portion of the piping assemblies which creates one or more patterns or sequence of patterns and wherein the markers are comprised of components each possessing, independently, identical or different selected material compositions with cross sectional areas corresponding to each of the components. At least two or more of the components are rings made from different materials with distinct measurable property differences along the length of the piping assemblies, wherein the rings collectively function by providing a readable identification (ID) code producing coded piping assemblies created when the one or more patterns or sequence of patterns are read.

The signals created can be in the form of code, including bar code, that comprise a portion of the datagrams.

The components are materials with properties selected from one or more or in any combination from a group consisting of; electrically conductive, electrically resistive, electrically insulative, electrically capacitive, electrically inductive, magnetically permeable, magnetically non-permeable, magnetically polarized, sonically transmissive, sonically absorptive, optically reflective, optically absorptive, radiation absorptive, radiation emissive that exhibit one or more features of said materials and wherein said components can be rings comprising said materials.

The readable ID code is read in precise locations along a length of said casing wherein the locations are a specific address corresponding to a feature either at the surface of, or embedded in the piping assemblies.

The markers appear as multiple readable bars to a reader that is reading permanent components of piping assemblies.

The multiple readable bars comprise a spatial, binary, and/or bar code wherein reading by scanning the code with a reader provides an ability for finding a specific address along the piping assembly and allows for carrying out an action at the address.

The piping assemblies are a casing which can also function as a production collar within a borehole wherein at least one reader is at least one probe and wherein the probe is an autonomous tool.

The reader can be one or more tethered probes. The one or more probes function alone or in any combination as a plug, sensor, computer, recorder, detector, scanner, and/or barcode scanner.

The one or more probes detect material property differences within permanent components within sections along the length of the casing.

At least one probe directs magnetic fields in a radial direction thereby measuring eddy currents and/or changes in eddy current intensity, and wherein the probe is shielded. At least one probe is unshielded.

One or more probes are singularly, collectively, or in any combination, reading, transmitting, computing, recording, receiving, distinguishing, networking, and/or measuring, at least a portion of one or more datagrams from signals generated, emitted, and/or transmitted from one or more probes.

The signals are being actively generated, emitted, and/or transmitted from piping assemblies and together can be converted into datagrams. The signals are passively generated, emitted, and/or transmitted from piping assemblies. Utilizing the probes and coded piping assemblies results in uninterrupted, unimpaired, detected material property changes in the markers by using detectable changes in eddy current values received from the coded piping assemblies.

The probes can be moving or stationary and the signals are read while the probes are moving or stationary. The collar can be moving or stationary.

The probes function as sensors in that they sense changes in permanent components of selected material compositions along the length of the piping assemblies. Permanent components are placed as radial sections in and along the length of the piping assemblies.

Marking the markers is accomplished while the piping assemblies are provided as one or more production collars being installed in one or more wellbores.

Providing readable ID codes within or from datagrams to a reader assists in identifying specific borehole features. The ID code can be further encoded or decoded by utilizing datagrams.

Providing readable ID code to a reader assists in identifying specific features within a wellbore casing.

Providing readable ID code assists in identifying branching of a borehole casing.

Readable ID code can be read by a reader when the reader is moving in either a forward or backward direction. Likewise, readable ID code is read by a reader on a wireline so that the code is translated into data and the data is sent to an uphole surface of a wellbore.

Also, the readable ID code can be read by a reader on a wireline which is conveyed by jointed piping, or continuous tubing, to the uphole surface. The readable ID code is read by a reader on a wireline which is conveyed by a tractor or pipe crawler. In addition, the ID code is read by a reader connected to equipment not limited to measuring, computing, recording and/or actuating.

The readable ID code can be read by a reader moved by fluids in the wellbore and not limited to pumping and production of the fluids. The readable ID code is read by a reader moved by gravity or moved by buoyancy in the fluid. The readable ID code is read by a reader moved by self-propulsion. The reader can take action upon reading the readable ID code where the action releases mechanical keys. The action could be actuating a mechanical, electrical, electromagnetic, magnetic, pneumatic, hydraulic, radioactive, or fiber optic circuit. The action could be, upon reading readable ID code, initiating measurements. The action upon reading readable ID code is communicating with a unique identifier to specific equipment along a length of and including an uphole surface of the borehole. Actuating communications is accomplished directly or remotely using wired or wireless communications.

These and other objects are attained in accordance with the present invention through the provision of a tubular housing having an energy fluctuation (such as pressure) responsive actuator movable therein between longitudinally spaced positions. Longitudinal movement of the actuator is used, for example, to cause shifting of an associated valve element between open and closed positions with respect to a flow passage. The passage being either internal to the housing, or through the side walls. The actuator includes a piston surface on which a pressurized working medium acts to develop a longitudinal actuating force, and the working medium is supplied from a chamber in the housing at a pressure substantially equal to the hydrostatic pressure of well fluids external to the housing.

The working medium is selectively supplied to an actuator piston via a system of control valves that are operably responsive to a battery-powered controller that is located in the housing. The actuator mandrel remains in one of its positions unless and until a datagram addressed to this valve is received by the controller. In accordance with one aspect of the invention, the datagram includes a sequence of low level pressure pulses applied at the surface to the well annulus. The datagram is encoded with the datagram address for identification that may also include data. For example, and not by way of limitation, each low level pressure pulse can have a peak value that continues for a specified duration. When a datagram is received, the controller decodes the datagram, identifies the address and reacts as instructed by the datagram. The data portion of the datagram causes the system of control valves to assume various states, whereby working medium under pressure is supplied to the actuator piston to develop the force necessary to cause the actuator to shift from one position to another. The actuator mandrel is returned to its original position in response to another datagram, with working medium being dumped to a low pressure chamber in the housing during the return movement. In one embodiment, return movement of the actuator mandrel is caused by a spring, and in another embodiment the return movement is forced by the working medium under pressure acting on the opposite side of the actuator piston. In the later embodiment, the control valve system and controller function to cause the working medium to be dumped from the opposite side of the piston to the low pressure chamber as the actuator mandrel is shifted back to its initial position.

Since only low level pressure pulses from datagram instructions are applied to the annulus to cause a change in the valve status downhole, the present disclosure and associated invention can be used in all wells including deep cased wells, as well as open hole. A large number of valve element cycles are possible through use of the system of the present invention. In addition, the system is a network that provides datagram, capabilities to numerous tools within or along the piping assembly. In downhole applications, increased numbers of well services using numerous well devices with specific addresses can be accessed and controlled with a single trip into the well. Overall operating time is reduced, and complicated and lengthy sequencing of high level annulus pressure applications are eliminated. The inventive system disclosed herein is relatively simple and compact and permits the lengths of downhole tool components to be considerably shortened in that an entire system can be utilized. Increased reliability also is achieved.

BRIEF DESCRIPTION OF THE DRAWINGS

The present invention has other objects, features and advantages which will become more clearly apparent in connection with the following detailed description of embodiments, taken in conjunction with the appended drawings in which.

DETAILED DESCRIPTION

Figure 1A:
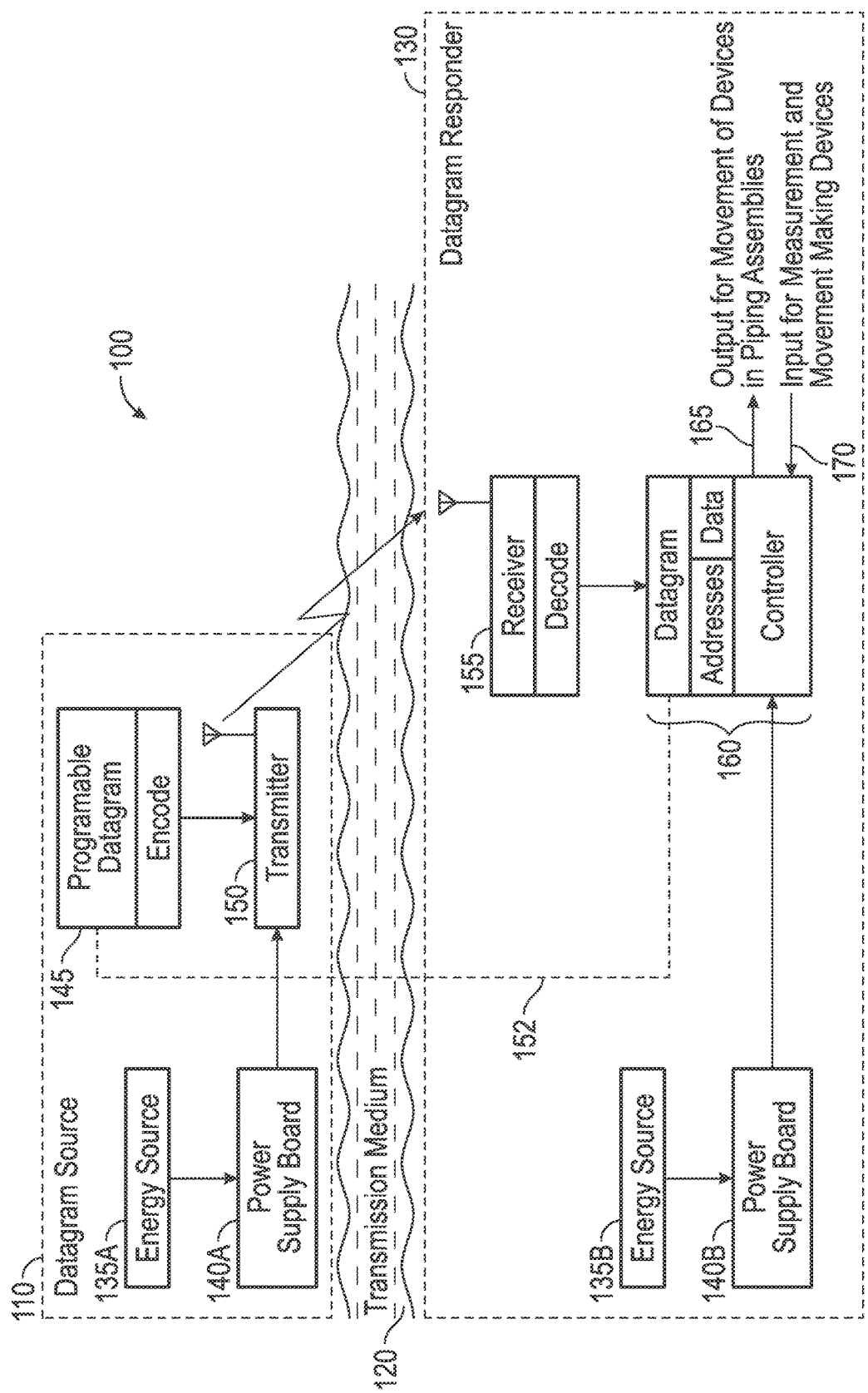
FIG. 1A is a block diagram of one embodiment of a system for controlling piping assemblies.
Figure 1B:
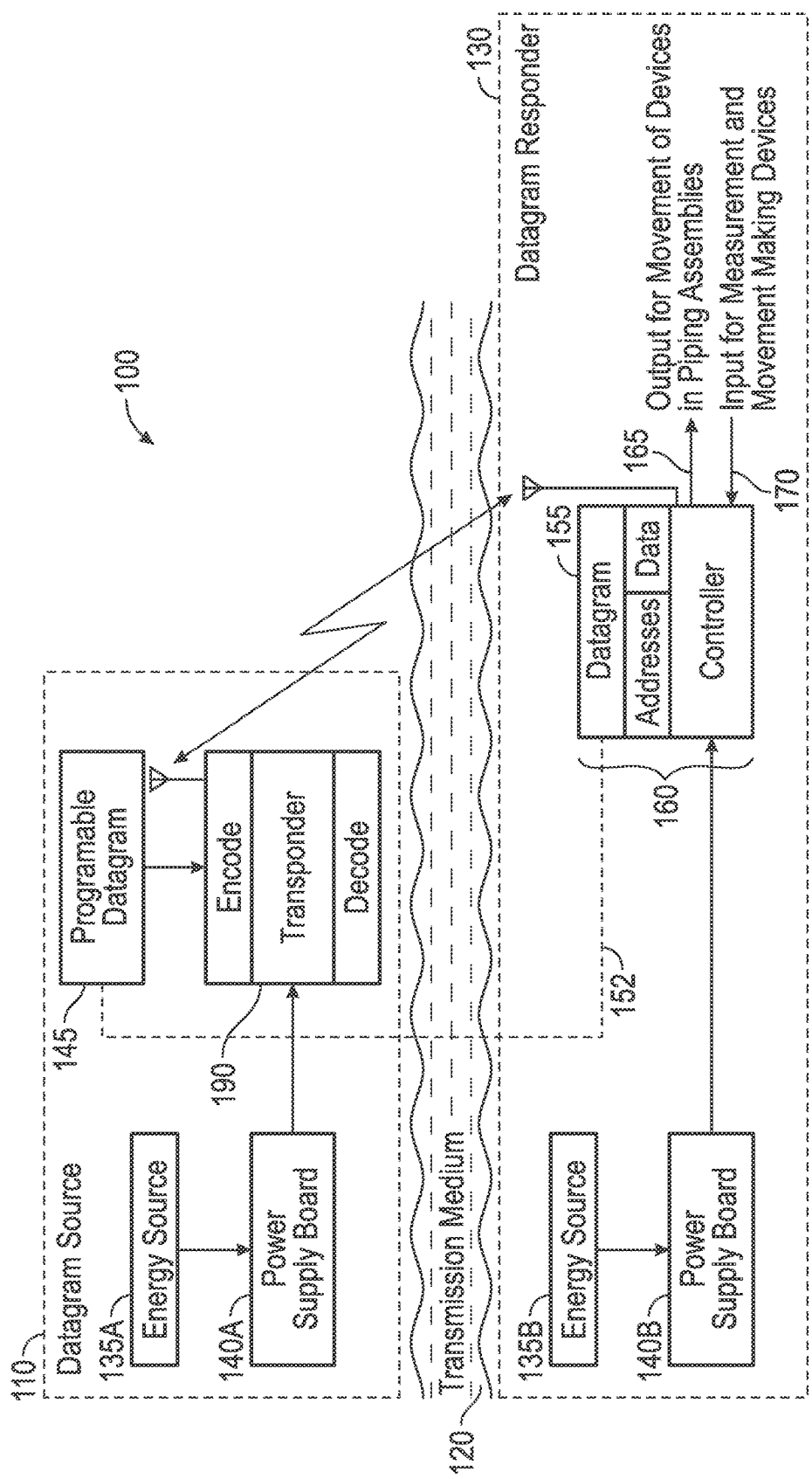
FIG. 1B is a block diagram of another embodiment of a system for controlling piping assemblies.

Referring initially to FIGS. 1 A and 1B, which are block diagrams of the system for controlling piping assemblies (100) is presented. The diagrams are split into three portions, the datagram source portion (110), the datagram responder portion (130) and a transmission medium (120) that exists between the source portion (110) and the responder portion (130). Energy sources (110) supplying power to power supply boards (140) are shown for both portions (110) and (130). Once the energy source is provided the energy can be transmitted to the power supply (normally circuit) board (140) which supplies the power to the system so that datagram signals are sent to a transmitter (150) and subsequently to a receiver (155), or transponder (190) as shown in FIG. 1B. The controller (160) is normally separately powered, but can also be powered by the same power supply board as the transmitter/receiver/transponder devices (150, 155, 190), as needed. The transmitter, receiver, transponder, and controller (150, 155, 190, and 160) are all controlled by using the programmable datagram—(145)—(which is also depicted in the schematic diagram in FIG. 2 as well as described in further detail below). Dotted line (152) indicates that a communication link can exist between the programmable datagram (145) and the controller (160). The datagram contains intelligence and instructions embedded by a program which can either be pre-programmed and stored within a separate computer (not shown) or within an intelligent controller (160) that includes the datagram information including addresses and data corresponding to controlling physical devices used in the piping system. Each address and each set of data can be arranged in combination with the controller and programmable datagram to provide output (165) to or receive input (170) from physical devices. These devices are capable of at least making measurements within or outside (along) the piping assemblies or movement or both. The datagrams can also send instructions requesting the transmission of measurements. As these devices become more and more intelligent along with the computer devices used to service them, the devices can themselves reach the level of being remote controlled robots. By inclusion of computerized controllers attached to or remote from these devices, the datagrams provide the needed instructions to cause an action (or absence of an action) by the controlled devices at specific addresses.

As described above, the "datagram" is meant to be a self-contained, independent entity of data carrying sufficient information to be routed from a source to a destination computer without reliance on earlier exchanges between the source and the destination computer and the transporting network. The datagrams contain logic packets of information that include one or more addressed portions and one or more data portions. The datagrams also include checksum portions and/or sequencing criteria portions. The addressed portions contained within the datagrams are accessible by the controller and provide for communication with individual, collective, groups, and/or networks of controllable devices. The data portions contained within the datagrams allow for controlling controllable devices by providing data portions corresponding with data obtained from making measurements within the medium.

Figure 2:
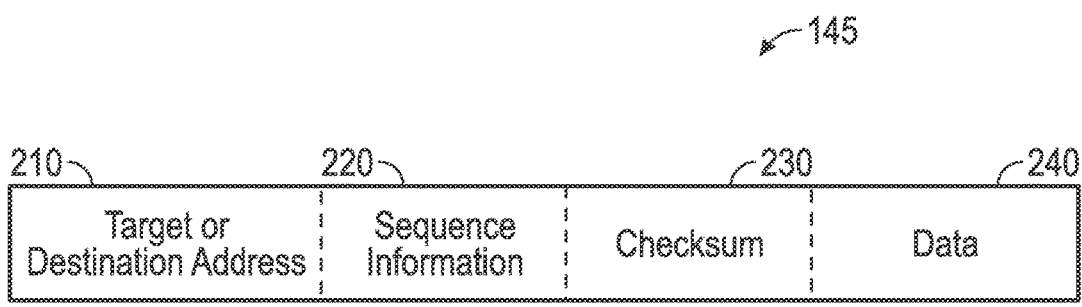
FIG. 2 is a depiction representative of information and algorithms stored in a datagram for use in the control of devices used in piping assemblies.

A graphical depiction of one such datagram (145) is shown in FIG. 2. In this case, the datagram contains a target or destination address portion (210), an optional sequence information portion (220), an optional checksum portion (230) and a data portion, (240). The datagram (145) of the present invention does not necessarily contain these portions in the same order and in some cases, the datagram (145) may contain only an address and data portion. In any case, the datagram (145) is programmable, and provides sequenced instructions from (220) regarding addressed sections from (210) for both the piping assembly and devices used by the piping assembly. The datagram (145) also includes the data portion (240) which allows for receiving, analyzing, and sending data in a specified format. In the present invention, the data are normally sent as signals regarding measurements and movements made along the length of the pipeline to "smart" devices that make the measurements and/or movements as required by the user.

Figure 3:
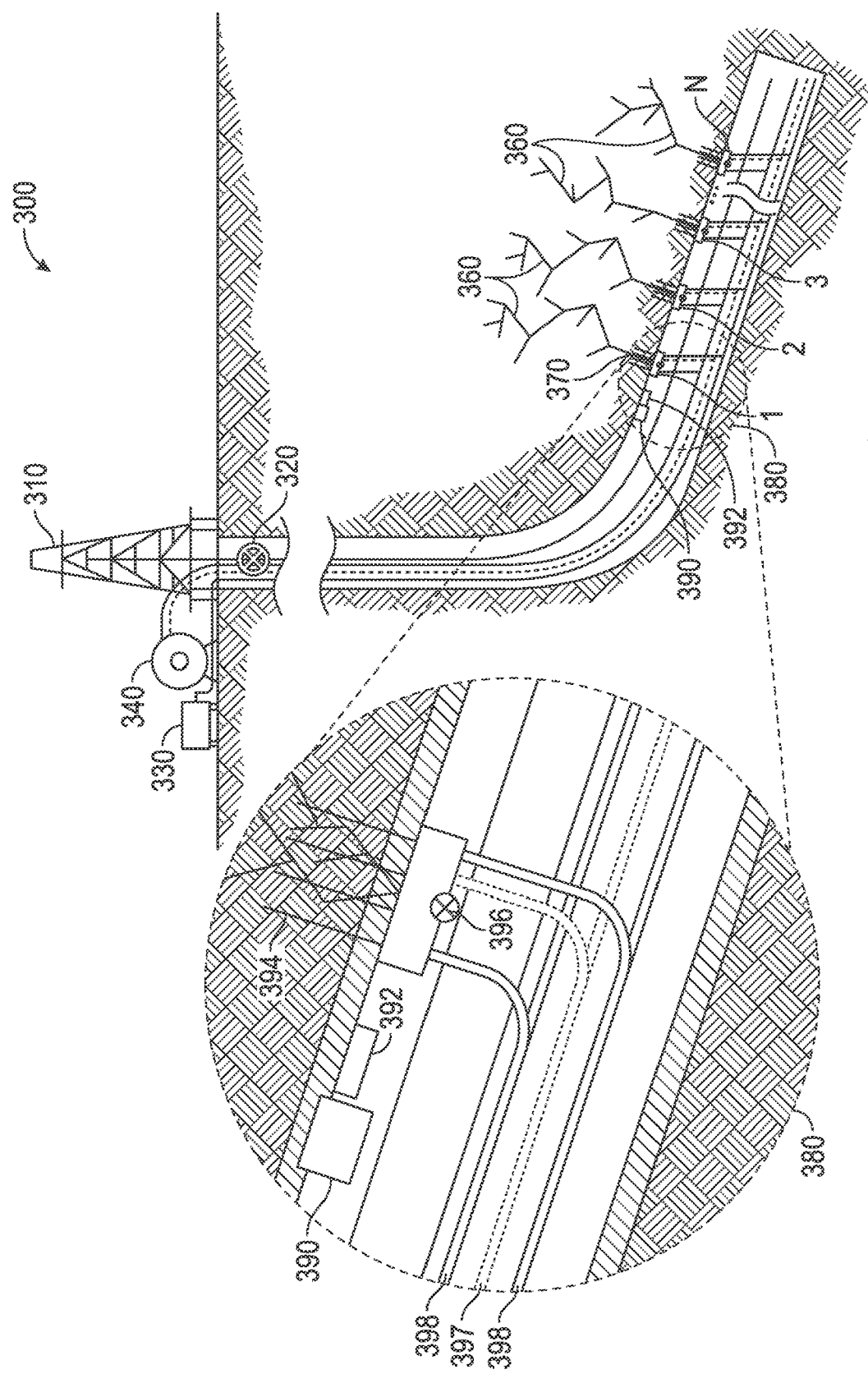
FIG. 3 is a schematic representation representing an overall system implementing the general control scheme of the present invention.

FIG. 3 is more specific to the use of the addressed datagrams for use in a well, developed for producing petroleum products. Here, the schematic representation (300) depicts an overall system implementing the general control scheme of the present invention. The diagram shows a wellhead (310) with a main valve control (320), such as a ball valve or the like. A power source (330) provides power to the system which includes a pump and optionally a winder assembly for sending operational lines downhole (340) which can bypass the main control valve (320). Further down the wellbore into the lateral (horizontal) section of the piping assembly are shown a series (1, 2, 3, . . . n) of valve assemblies (396) and additional equipment (370) which can penetrate the casing into the formation. This equipment is controlled via the system of the present invention. The valve assemblies (396) are normally located within the casing or production tubing and attached to a side portion of the casing/tubing so that the flow of production fluid (oil and/or gas and at times water) can be controlled. The schematic of FIG. 3 provided shows fissures (360) created by fracing of the formation to increase production for shale deposits (as one example). An enlarged (exploded) view of the wellbore (380) is provided to further illustrate one cross-sectional area of the wellbore. In this instance, one or more downhole controllers (390) are provided and shown as attached or embedded within the casing/tubing. Additional sensors (392) are also provided, as needed, and also attached in a similar fashion as that of the controllers. The sensors are utilized to sense changes in pressure, temperature, flow, density, gamma/beta radioactivity, electromagnetic radiation, generated light by for example, lasers, eddy currents, etc. As the sensors determine these changes, the sensors provide data input to the controllers. The controllers then provide instruction in the form of directions using datagrams as described above. In the exploded view diagram of the cross-section provided (380), one of the valves of the valve assemblies (370) (which can be slider valves, ball valves, or otherwise controlled displacement valves, etc.), are shown (396) and illustrate the ability to penetrate the casing/tubing in order to allow for flow interruption as needed. Sandscreens (394) are shown which provide protection for the valves in that they function as filters between the formation and the valve. In this manner, the chances of the valves malfunctioning due to particulate build-up in the valve is substantially reduced. As shown, there are also (often hydraulic lines (398) which may be directly attached to the valves (396) from uphole. Electrical and/or optical cables or conduits (397) are also shown as possible for connection to the down-hole devices. By deploying these lines using the equipment shown (330, 340), it is possible to further control the overall system and precisely perform opening and closing operations on the valves (396) and valve assemblies (370, and 392).

Figure 4:
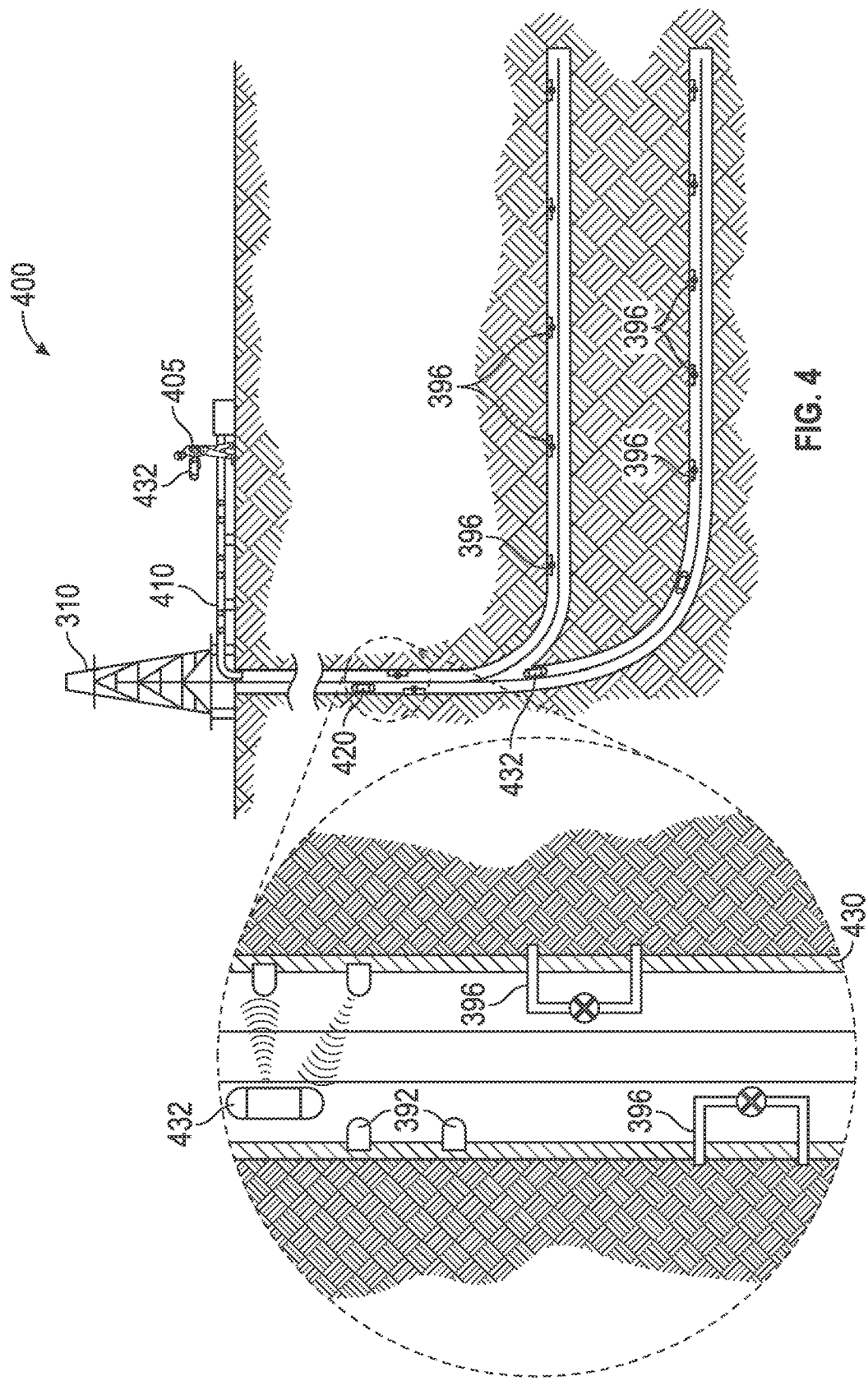
FIG. 4 is a schematic representation indicating how probes can be used to provide control and movement of devices during drilling, completion, and producing of oil and gas wells within piping assemblies.

FIG. 4 is a schematic representation (400) of the use of probes in the same down-hole application for the presently described system. Specifically, the probes (432) are sent down-hole from an uphole holding or repository station (401), which includes a probe sending device or person (405) responsible for sending the probe into an uphole piping assembly (410). The probes (432) can be equipped with transmitters, receivers, transponders, and/or sensors as needed, based on the desired operation that the probe is required to perform. The production tubing or casing within the borehole (420) can similarly be equipped with transmitters, receivers, transponders, and/or sensors, so that the system includes "smart" probes and/or "smart" production tubing/casing. An exploded view cross-sectional area of the borehole (420) is shown (430) which indicates the use of casing or tubing valves (396) that may be identical to or different from those shown in FIG. 3. The probes (432) also can utilize the same or different sensors (392) as shown in both the schematics of FIGS. 3 and 4. In an additional embodiment, the probes (432) themselves may carry sensors (392) and act in unison with either an uphole or downhole controller to perform necessary operations within the wellbore. In a further embodiment, the probes (432) sense changes in the casing or the production tubing which not only provides an exact address for a downhole device (such as the valves—396) but also signals the probe to perform one or more operations at that address. In addition, controllers can be added to the probes (432) or to the tubing/casing to ensure that operations within the piping assembly are accomplished properly. When one or more probes (432) are sent into the piping assembly, the controllers utilize datagrams as described above and shown in FIGS. 1 and 2 and further described and illustrated in FIG. 5, for establishing communications between the user (405), the probe (432), and devices existing within the piping assembly 390, 392, 396, etc). By using these datagrams, devices within the piping assembly can be intelligently controlled and activated either by a preprogrammed set of instructions, or dynamically by sending instructions utilizing the datagrams.

Figure 5:
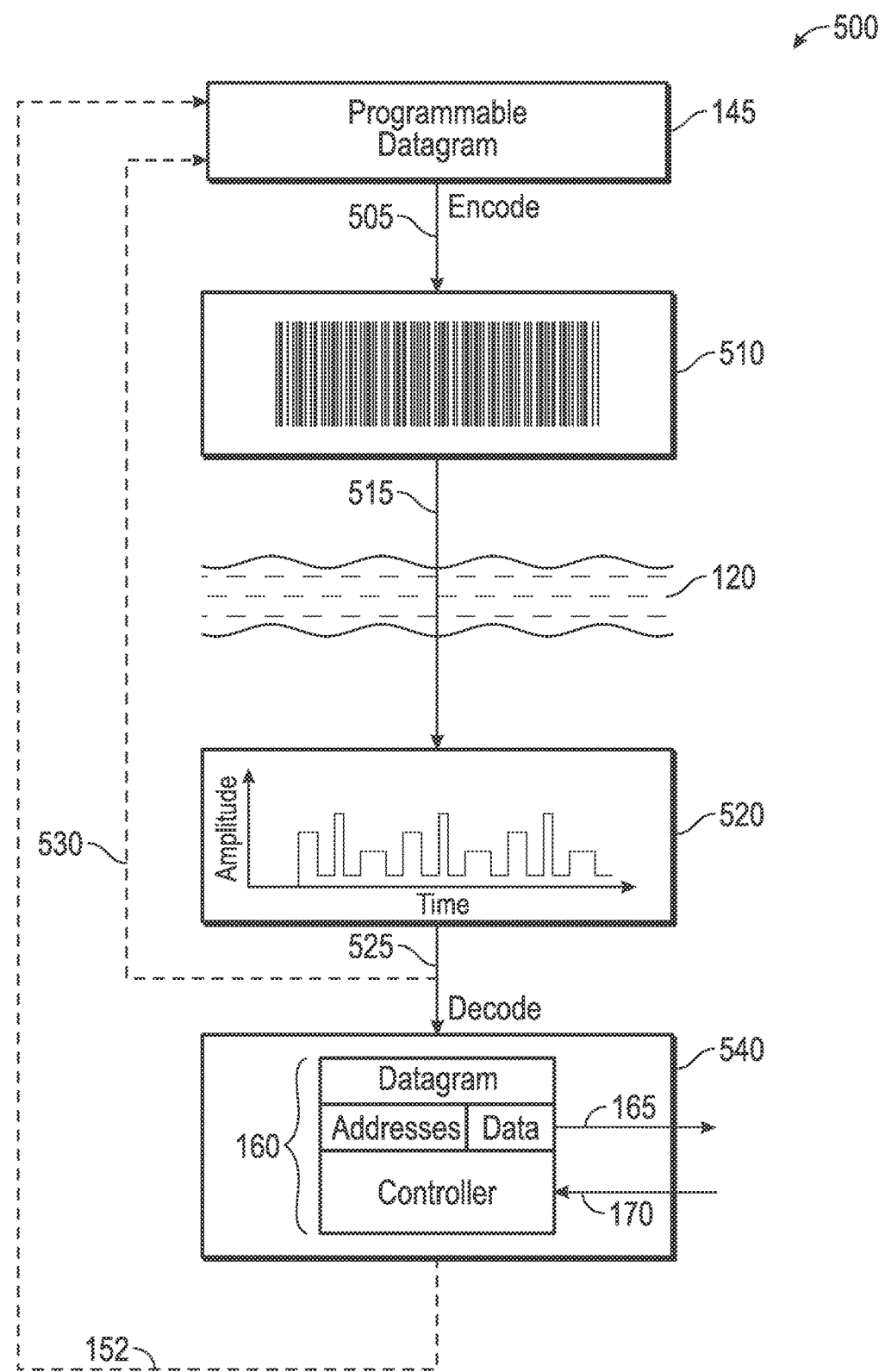
FIG. 5 is a flow diagram indicating how programmable datagrams can be used for controlling devices in piping assemblies by translating datagrams into barcodes that create energy changes within a medium and are interpreted by a controller for controlling the devices.

FIG. 5 is a flowchart (500) that illustrates one of many possible embodiments whereby a sequence of events occurs for controlling devices associated with the piping assembly. The programmable datagram (145) is developed with instructions from a user and encoded (505) with, in this case, a bar code (510). The bar code (510) is a spatial representation of the instructions being subsequently sent through a transmission medium (120) resulting in changes in energy pulses (520) represented in the plot illustrating such pulses that have varying amplitude over specific lengths of time. The energy pulses are from energy sources that provide fluctuations in, for example, volumes and pressures, light, electricity, electromagnetic fields including eddy currents, chemical reactions including controlled explosions, electrically stimulated or activated polymers, etc. Causing these fluctuations and controlling them is critical to the present invention.

Once the time dependent changes in energy pulses (520) are provided, the information from this data set is sent and/or decoded in the controller unit (160)—depicted here as residing in a box (540) which represents a controller assembly. The flow path continues (525) toward a controller assembly (540). In addition, a flow path (530) is shown here indicating that it is possible to notify the user that the datagram has been delivered to the controller. This assists in making the programmable datagram (145) and datagram controller assembly (540) more reliable. Once the flow path reaches the controller (160) and overall controller assembly (540), the operations described for FIGS. 1A and 1B are possible in that output signals are provided (165) in order to allow for and create movement of controllable devices within the piping assembly. Likewise, input can be received from the measurements and/or movements associated with the piping assembly. The flow path (152) exists so that a response can be submitted back to the user and/or datagram indicating that information was received in the form of, for example, pressure (energy changes) pulses allowing the output (165) to act on and control actual physical devices.

It is critical to the present invention to recognize that FIGS. 1-5 are meant to be representative and indicative of a networkable control system. The control system allows for actuating any number of controllable devices in any number of sequences or series so that multiple devices associated with one or more networkable piping systems can be individually, simultaneously, and/or instantly controlled by the user. This capability ensures that the user can control any part of the addressed piping assembly controllable devices at any time and in any manner along the length of the assembly using properly designed and programmed datagrams.

EXAMPLE

More specifically, for downhole well completion, one example of how the control system with addressed datagrams would operate is as follows;

A user would either send a set of programmed instructions to a controller or utilize a probe with a set of instructions downhole into the wellbore via a transmitter and/or transponder. The set of instructions, in this case, would be to open or close a well completion valve or set of well completion valves located at a specific address within the production tubing or casing. Energy pulses are formed by changes in pressures controlled within the tubing that is accomplished by using a pressure responsive member (such as a piston or a pilot valve) which is adapted to be shifted from one position to another position. The pressure responsive surface located near or on the valve is supplied by the working medium (within the wellbore) to the responsive surface at a pressure substantially equal to the hydrostatic pressure of the wellbore fluid. This allows for shifting the pressure responsive member from an initial position to another position in response to the programmed datagrams.

The working system includes some of the features associated with U.S. Pat. Nos. 4,796,699 and 4,856,595 describing an alternate well tool control system, the full contents of which are hereby incorporated by reference.

Supplying the working medium to the responsive surface includes the use of a high pressure chamber either within or in proximity to the well completion valve(s) adapted to contain a discrete volume of the working medium, and provides for transmitting hydrostatic pressure to the high pressure chamber to pressurize the working medium. Supplying the working medium can further include supplying a passage leading from the high pressure chamber to the pressure responsive surface, and using a pilot or other control valve that is operably responsive to the datagram instructions that develop commands. The datagrams, for example, can provide instructions to controllers (or a network of controllers) for; locating the valve or set of valves at specific addresses, providing instructions to the valve actuators regarding the percentage of opening or closing the valve(s), the time and/or length of time the valve(s) should be opened or closed, under what operating temperatures and pressures the valve(s) should or should not respond, a specified flow rate at which a specified valve or set of valves should open or close partially or fully and also signal for controlling the flow of the medium through the supply passage.

In this case, valve actuators are a control valve that includes a first pilot valve movable between opened and closed positions respectively permitting and terminating flow of the fluid medium through the supply passage. Supplying the medium further includes a first solenoid valve for controlling the position of the first pilot valve. The pilot valve has opposite sides and allows biasing of the pilot valve toward the closed position, the first solenoid valve functioning to either permit hydrostatic pressure to act on both sides of the pilot valve whereby the pilot valve remains biased to the closed position, or to communicate one side of the pilot valve with the low pressure chamber. The hydrostatic pressure acting on the other side of the pilot valve moves the pilot valve to an open position.

Here, the solenoid valve includes first and second normally closed solenoid valve assemblies, the first solenoid valve assembly being located in a high pressure line that extends from the high pressure chamber to one side of the pilot valve and the second solenoid valve assembly being located in a low pressure line leading from the initial side to the low pressure chamber. When only the second solenoid valve assembly is energized, the pilot valve moves to an open position, and when only the first solenoid valve assembly is energized the pilot valve is moved according to the biasing to the closed position.

In this case, the pressure responsive member has a piston section, the pressure responsive surface being defined by a first surface of the piston section; a cylinder residing within the member in which the piston section is movable, whereby when the working medium is supplied to the first surface of the piston section, the piston section and member move in one longitudinal direction; and wherein the member includes an exhaust passage for exhausting working medium exiting from the cylinder when the first pilot valve is in its closed position; and allowing for moving the piston section and member in the opposite longitudinal direction as the working medium is exhausted. A spring is used for reacting against a second surface of the piston section.

In this example, the exhaust passage communicates the first surface of the piston section with the low pressure chamber, further includes an additional control valve that operably exhausts responsive to a datagram for controlling exhaust of the medium through the exhaust passage.

An additional control valve includes a second pilot valve that is movable between opened and closed positions thereby respectively permitting and terminating flow of the medium through the exhaust passage to the low pressure chamber. The additional control valve further includes a second solenoid valve for controlling the position of the second pilot valve wherein the second pilot valve has opposite sides and is biasing the second pilot valve toward its closed position, the second solenoid valve functioning to either permit the hydrostatic pressure to act on both sides of the second pilot valve. The biasing closes the second pilot valve or communicates one side of the second pilot valve with the low pressure chamber whereby hydrostatic pressure acting on the other side moves the second pilot valve to the open position.

The second solenoid valve includes third and fourth normally closed solenoid valve assemblies, the third solenoid valve assembly being located in a second high pressure line extending from the high pressure chamber to one side of the second pilot valve. The fourth solenoid valve assembly is located in a second low pressure line leading from one side of the second pilot valve to the low pressure chamber, whereby when only the fourth solenoid valve assembly is energized the second pilot valve moves to an open position. Likewise, when only the third solenoid valve assembly is energized, the second pilot valve is moved by biasing to the closed position.

It is also possible to include one or more sleeve valves on the pressure responsive member, where the valves include a housing having a port for communicating the interior of the housing with the well annulus outside the housing. The sleeve valves are arranged in one position to span and close off ports within the casing or production tubing and are arranged in another position to open the port and permit circulation of well fluids via the port between the interior and exterior of the housing.

It is also possible to include one or more ball valves coupled to the pressure responsive member, the member including a housing having a flow passage therein. The ball valves are arranged to pivot about an axis that is transverse to the flow passage between a closed position with respect to the passage when the member is in an initial position and an open position with respect to the flow passage when the member is in another position.

The pressure responsive member here, is a tubular mandrel. The mandrel has an outwardly directed flange with a piston disposed within the flange having opposite sides, one of the sides providing the pressure responsive surface. When fluid is acting on the other side of the piston it causes returning the mandrel to the initial position when the hydrostatic pressure acting on one of the sides of the piston is reduced.

In order to ensure responsiveness of the system, a supply of a high pressure chambers is arranged to contain the working medium and a low pressure chamber in the wellbore that is arranged to receive an exhaust of the working medium. A control valve is employed and controlled by the datagram system which alternately supplies working medium from the high pressure chamber for acting on the pressure responsive surface and exhausting working medium to the low pressure chamber after the medium has acted on the pressure responsive surface.

The system may further include one or more sensors for detecting and receiving the datagrams and associated datagrams and providing output signals and datagrams. The one or more controllers receive and interpret the output using the programmed instructions within the datagram and also detect the presence or absence of a signature pattern such as a bar code. This set of instructions and presence of the code provides a triggering operation regarding activating or deactivating the well completion valve or set of valves. The valve(s) include a plurality of solenoid valve assemblies, and further include a driver coupled between the controller(s) and the solenoid valve assemblies for energizing a plurality of solenoid valve assemblies when triggered by the controller(s).

The system describe herein involves the use of compact, simple and reliable devices which can be controlled individually, collectively, in groups, or by using networks, so that numerous devices can be actuated on as needed basis. Since certain changes or modifications may be made in the disclosed embodiments without departing from the inventive concepts involved, it is the aim of the following claims to cover all such changes and modifications falling within the true spirit and scope of the present invention.

We claim:

1. A control system for generating and utilizing at least one or more addressed datagrams that communicate information to and from devices along piping assemblies comprising;
   one or more transponders and one or more controllers,
      wherein said transponders transmit and receive information via said one or more addressed datagrams
      wherein said control system operates in a medium that is a mechanical, hydraulic, electrical, electromagnetic, optical, radioactive, and/or chemical medium and wherein said transponders are utilized by; one or more controllable devices being operated between an open position and a closed position wherein operating between said open and closed position provides a measurable quantity of change so that signals are generated and controlled by changes occurring within said medium channeled either directly through said controllable devices or bypassing said devices, or both wherein both controllers and said devices are capable of computing and are computer programmable, comprising one or more memories, one or more time clocks that keep track of time, and a status that is capable of reporting inputs, outputs, and resulting events by using said logic packets of information obtained from datagrams for controlling said controllable devices. and wherein said computing within both controllers and said controllable devices includes; retrieving, storing, analyzing, organizing, and disseminating information from measurements obtained within said medium using datagrams capable of providing, storing, and accessing data within controllers so that said controllers can perform logical operations when actuating said controllable devices wherein said controllable devices utilize one or more flow restrictors thereby providing a measurable quantity of said signals.

2. The system of claim 1, wherein said transponders convert said datagrams into signals that are transmitted and wherein said transponder receive signals from said transmitters and said receivers also convert signals back into datagrams.

3. The system of claim 1, wherein said one or more controllers receive and decode one or more datagrams so that said controllers selectively communicate and perform logical operations causing said devices to perform one or more actions.

4. The system of claim 1, wherein said actions are measurements and/or movements.

5. The system of claim 1, wherein said datagrams send instructions requesting transmission of measurements.

6. The system of claim 1, wherein said datagrams create and transmit new or existing datagrams.

7. The system of claim 1, wherein said transponders can cause one or more actions in response to information from said datagrams.

8. The system of claim 1, wherein said datagrams contain logic packets of information that include one or more address portions and one or more data portions.

9. The system of claim 1, wherein said datagrams also include checksum portions and/or sequencing criteria portions.

10. The system of claim 1, wherein said address portions contained within said datagrams are accessible by said controller and provides for communication with individual, collective, groups and/or networks of controllable devices.

11. The system of claim 1, wherein said data portions contained within said datagrams allow for controlling controllable devices by providing data portions corresponding with data obtained from making measurements within said medium.

12. The system of claim 1, wherein said transponders and controllers together with said datagrams comprise a mesh network.

13. The system of claim 1, wherein said datagrams adhere to a common system datagram protocol.

14. The system of claim 1, wherein said datagrams contain IP addresses.

15. The system of claim 1, wherein said datagrams are encoded and decoded into barcodes.

16. The system of claim 1, wherein said controllable devices are well completion devices for wellbores.

17. The system of claim 16, wherein said controllable devices exist within tubing and/or casing of said wellbores.

18. The system of claim 16, wherein said controllable devices are selected from the group consisting of; valves, switches, transducers, transistors, laser transmitters and receivers, and optical fiber networks.

19. The system of claim 16, wherein said completion devices contain one or more transponders.

20. The system of claim 1, wherein said piping assembly is a downhole assembly within a borehole.

21. The system of claim 1, wherein said control system controls multiple devices within multiple zones along a length of said downhole assembly within said borehole.

* * * * *